United States Patent
Narayan et al.

(10) Patent No.: US 6,859,937 B1
(45) Date of Patent: Feb. 22, 2005

(54) CONTEXT-SENSITIVE OPTIONS PANEL

(75) Inventors: Murari Narayan, Issaquah, WA (US); Alan C. Yates, Redmond, WA (US); Genessa L. Krasnow, Seattle, WA (US); Adam Wolff, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/464,737

(22) Filed: Dec. 15, 1999

(51) Int. Cl.⁷ .............................. G06F 3/00; G06F 13/00; H04N 5/445

(52) U.S. Cl. .................. 725/37; 725/51; 725/109; 725/110; 725/39; 345/718

(58) Field of Search ..................... 725/51, 109, 110, 725/133, 141–153, 142, 113, 37, 39, 40–44; 345/708, 718, 845, 840, 825, 811, 717

(56) References Cited

U.S. PATENT DOCUMENTS

| | | | | |
|---|---|---|---|---|
| 6,005,565 A | * | 12/1999 | Legall et al. | 345/327 |
| 6,028,600 A | * | 2/2000 | Rosin et al. | 345/327 |
| 6,141,003 A | * | 10/2000 | Chor et al. | 345/719 |
| 6,177,931 B1 | * | 1/2001 | Alexander et al. | 725/52 |
| 6,202,212 B1 | * | 3/2001 | Sturgeon et al. | 725/141 |
| 6,219,042 B1 | * | 4/2001 | Anderson et al. | 345/327 |
| 6,348,932 B1 | * | 2/2002 | Nishikawa et al. | 345/719 |
| 6,407,779 B1 | * | 6/2002 | Herz | 348/734 |
| 6,490,726 B2 | * | 12/2002 | Harrison et al. | 725/110 |

OTHER PUBLICATIONS

Russel, Charlie and Crawford, Sharon, "Running Microsoft Windows NT Server 4.0", 1997, Microsoft Press, pp. 561–562.*

* cited by examiner

*Primary Examiner*—Vivek Srivastava
*Assistant Examiner*—Matthew Demicco
(74) *Attorney, Agent, or Firm*—Law Offices of Albert S. Michalik, PLLC (57) ABSTRACT

The present invention provides a system and method for integrating convention television viewing with Internet-related activities. A viewer accesses both conventional television features and Internet-related features from a single, familiar options panel. The options panel provides the user with a set of buttons that invoke features of both the television mode and of Internet mode. The options panel is selectively accessible at any time while either accessing the Internet or while viewing conventional television programming, the providing the user with a unified viewing experience.

13 Claims, 7 Drawing Sheets

CONTEXT-SENSITIVE OPTIONS PANEL

FIELD OF THE INVENTION

The present invention relates to Internet browsing and television viewing. More particularly, the invention relates to a system for integrating Internet browsing with television viewing.

BACKGROUND OF THE INVENTION

The advent of the Internet has endeared millions of people to the idea of casually browsing for information on an endless number of topics. Until recently, browsing the Internet required the use of a conventional computer system properly configured with the necessary Internet-related operating system components and applications, such as a browser and e-mail program. Unfortunately, conventional computers are relatively expensive and require a fair amount of training before an individual can expertly explore the Internet.

Recent advances in technology have evolved into systems that allow Internet access over a television set with the addition of a relatively inexpensive Internet access terminal. One such Internet access terminal is the WEBTV Internet access terminal, developed and marketed by WEBTV Networks, Inc. of Mountain View, Calif. Such Internet access terminals provide users with an inexpensive and less complicated way to take advantage of the many features of the Internet. However, existing Internet access terminals suffer from several problems. For instance, the user experience is divided into a television experience of an Internet experience.

More specifically, the interface provided by existing Internet access terminals requires a user to switch between a television mode and an Internet mode. The user generally cannot simultaneously access features of both television viewing and Internet use. The only known attempt at integrating the television experience with the Internet experience is simply displaying, in a small window, the current television programming while the use is in an Internet mode. That solution falls short of ideal because the user may have access to Internet features while watching the television programming, but the user does not have simultaneous access to both television mode features and Internet mode features.

Another problem with existing systems is that if the user has browsed away from a home page or a start page, the user does not have easy access to the features made available by the access terminal. For instance, if a user has browsed away from a starting page having an e-mail button, and the user desires to review his e-mail, the user must return to the starting page or otherwise leave the current page. For the unsophisticated user, finding the way back to the starting page can be cumbersome or confusing.

A system for integrating the Internet browsing experience with the television viewing experience has eluded those skilled in the art. Thus, users cannot simultaneously access features associated with both television viewing and Internet browsing through current Internet access terminals.

SUMMARY OF THE INVENTION

The present invention provides a system and method for integrating conventional television viewing with Internet browsing and other Internet-related activities. In contrast to existing systems, the present invention allows a viewer to access both conventional television features and Internet-related features from a single convenient options panel. The options panel provides the user with a set of buttons that invokes features of both the television mode and the Internet mode. The options panel is selectively accessible at any time while either accessing the Internet or while viewing conventional television programming.

Briefly stated, the invention provides an options panel for selective use while interacting with a television set having an Internet access terminal. The options panel may have both persistent options and context options, e.g. in the form of buttons displayed on the options panel. The persistent buttons generally react in a common manner regardless of whether the user activates the button while interacting with the Internet or while viewing television. The context buttons react in a manner that reflects a current state of a main window. Certain context buttons invoke one set of features when the main window is in a first mode, such as an Internet mode. The context buttons, or their equivalents, invoke a different set of features when the main window is in a second mode, such as a television node.

In one aspect, the options panel is instantly available and may be selectively invoked by user action, such as by pressing a button on a remote control, the set-top box, or through voice-recognized commands, at any time during a session. When invoked, the options panel varies its choices based on the mode in which the access terminal is operating, for example, either in Internet mode or in television mode. In other words, based on the current mode, the options panel assigns pre-defined functionality to any context buttons on the options panel. Persistant buttons are assigned functions without regard to the current mode of operation of the access terminal.

In another aspect, triggering a context button may cause a second panel to become available. More particularly, triggering a context button on the options panel may result in a second level panel being displayed with a set of features based on the functionality currently assigned to the context button. Thus, two or more second level panels may be associated with the same context button on the options panel. The current mode of operation determines which of the two or more second level panels is displayed in response to triggering the context button.

In yet another aspect, the options panel provides a registration mechanisms, such as via an Application Programming Interface (API) call, through which applications may register themselves with the options panel. In that manner, the applications may provide one or more context buttons on the options panel that react to being triggered in different ways, depending on the current mode of operation of the access terminal.

The many advantages of the present invention will become more apparent from the following detailed description taken in conjunction with the drawings.

DETAILED DESCRIPTION OF THE PREFERRED EMBODIMENT

Figure 1:
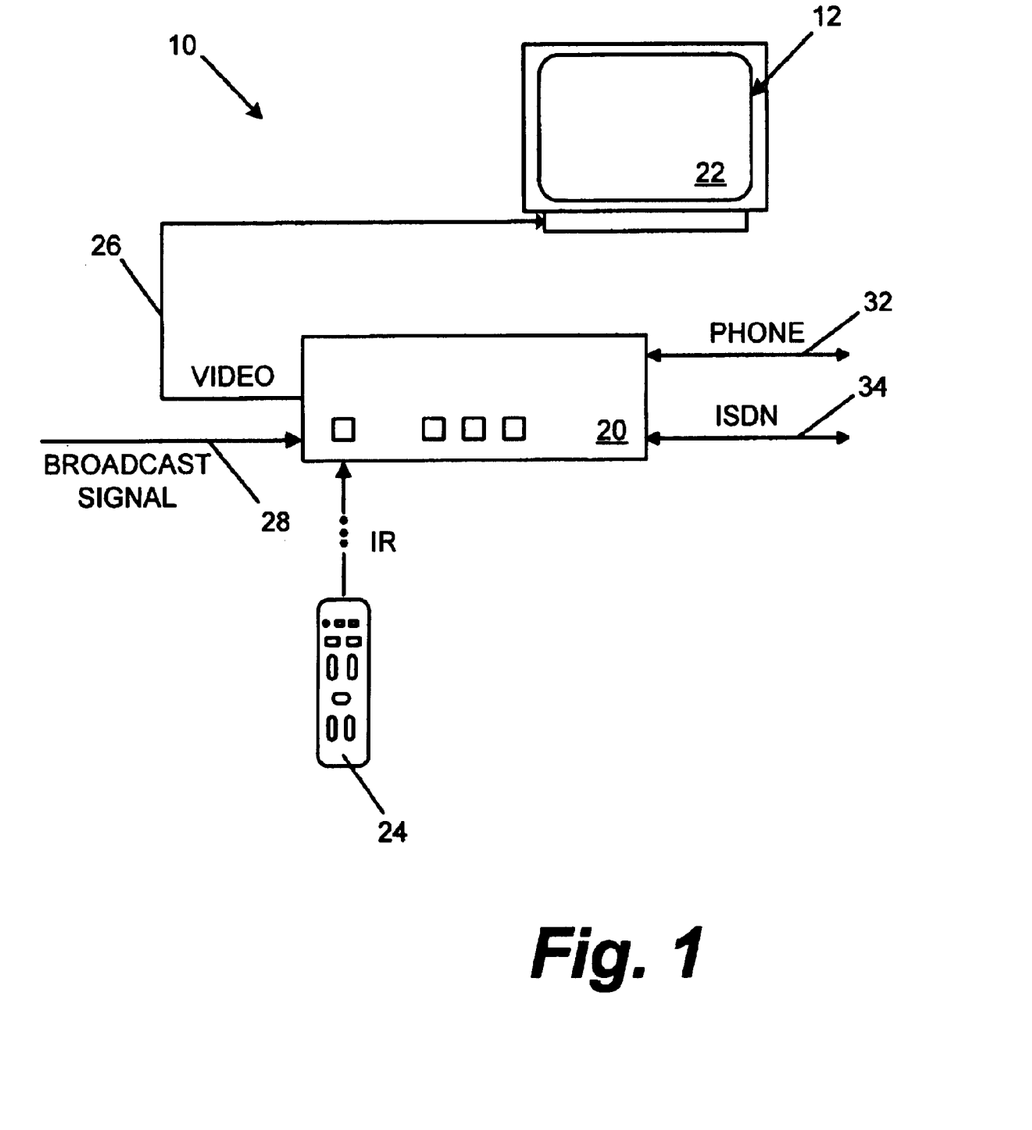
FIG. 1 is a schematic view of an Internet/television access terminal according to the present invention.

One embodiment of an Internet access terminal 10 in accordance with the present invention is illustrated in FIG. 1. Terminal 10 includes a user interface 12 for displaying substantive content of the session (i.e., television programming or Internet content), and for selectively displaying various configuration and options panels. The terminal 10 is configured to operate in two modes, a television mode and an Internet mode. As used herein, the term "Internet mode" is not limited to browsing Web pages, and includes other computing activities, such an e-mail usage, chatting, reading newsgroups, executing an application, and so forth. As described in more detail below, the present invention allows the user to transition between each of the two modes with relatively little indication that there are distinct modes.

In one disclosed embodiment, the terminal 10 is preferably, but not necessarily, a WEBTV Internet access terminal. As shown in FIG. 1, the terminal 10 includes a control system in the form of an electronics unit, often referred to as a "set-top box" 20. Terminal 10 also includes a display in the form of a television set 22 connected to the set-top box 20. It should be understood that any display device capable of displaying graphical images, such as a computer monitor, could be used in place of the television 22. Alternatively, the set-top box 20 may be built into the television set 22 as an integral unit. The set-top box 20 is user-controllable by a selection devices, such as a remote control 24, integral control buttons. Although depicted as similar to a remote control for a television, the remote control 24 may also include an alphanumeric keyboard or the like to allow a user greater input capabilities.

As also shown in FIG. 1, the set-top box 20 receives commands from remote control 24 via an infrared (IR) communication link. Alternatively, any link that allows the remote control 24 to provide commands to the set-top box 20 is acceptable, such as an electro-magnetic wave at any frequency, hard wires, sound waves, or the like.

The terminal 10 uses the television set 22 as a display device for displaying the user interface 12. The set-top box 20 is coupled to the television set 22 by a video link 26. The video link 26 may be an RF, S-video, composite video, or other equivalent form of video link. Audio signals may also be modulated with the video signals, or provided to the television set 22 via a separate audio link (not shown).

The set-top box 20 includes hardware and software for receiving and decoding broadcast video signals 28, such as an NTSC, PAI, SECAM or other TV system video signals. The set-top box 20 also includes hardware and software to create the user interface 12, by which the user can access various Internet system network services, browse the Web, send E-mail, and otherwise access the Internet or control television viewing.

Terminal 10 may include a standard modem, an ISDN modem, an ADSL modem, satellite receiver, or other communications device. The terminal 10 connects to the Internet by way of the communications device. Those skilled in the art will appreciate that the broadcast signal 28 and the Internet signals may me combined and transmitted over the same medium, such as over a broadband coaxial cable. The particular media over which the television and Internet signals are received is not important to the proper function of the present invention.

Figure 2:
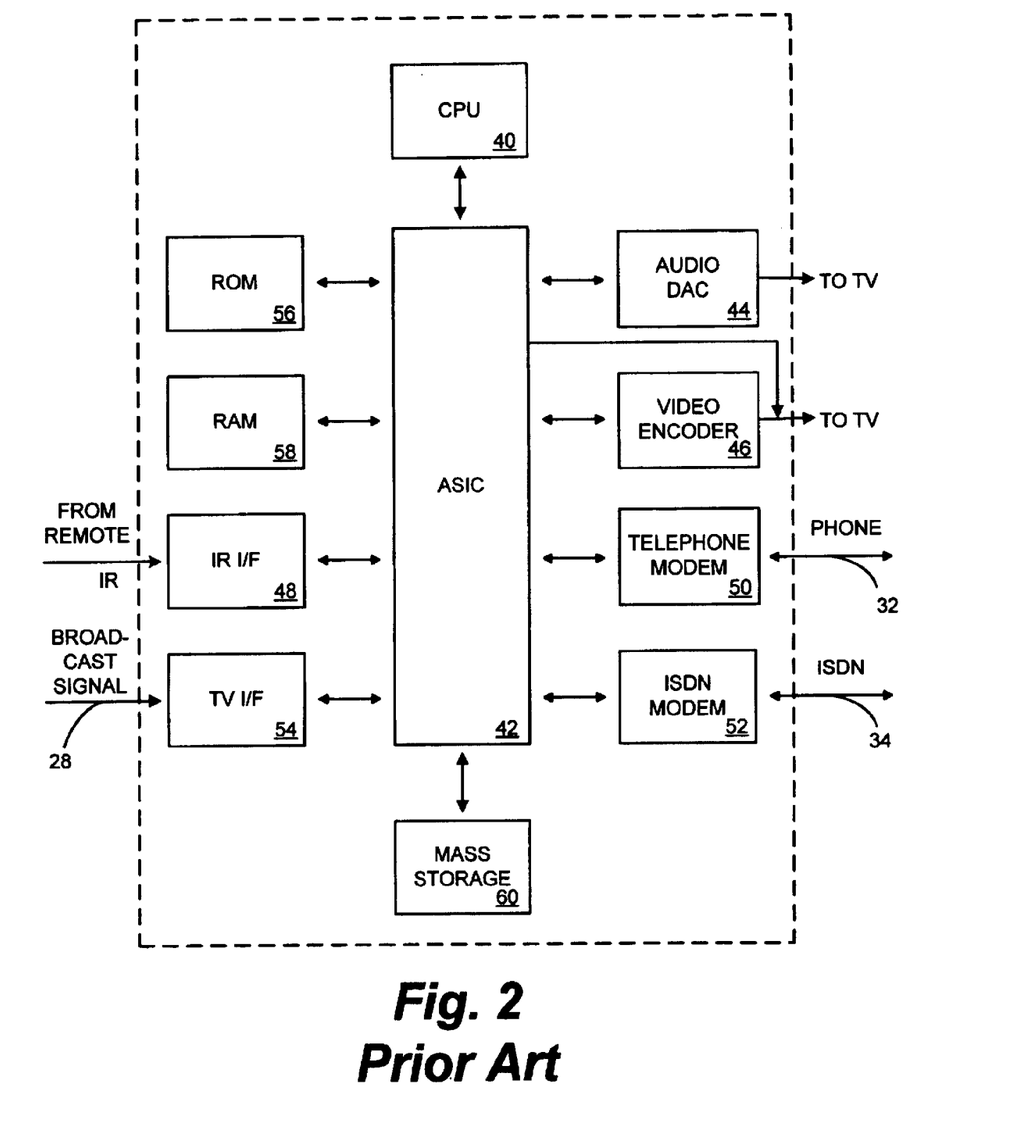
FIG. 2 is a schematic view illustrating components within the architecture of the terminal of FIG. 1.

FIG. 2 is a block diagram illustrating the principal internal features of the set-top box 20. In this example, operation of the set-top box 20 is controlled by a processing unit, such as a central processing unit (CPU) 40, which is coupled to an Application-Specific Integrated Circuit (ASIC) 42. The CPU 40 executes software designed to implement various capabilities and features of the set-top box 20. The ASIC 42 contains activity which may be used to implement some features as well. The ASIC 42 is coupled to an audio digital-to-analog converter (DAC) 44 that provides audio output to the television set 22. In addition, the ASIC 42 is coupled to a video encounter 46 that provides video output to the television set 22. An IR interface 48 detects IR signals transmitted by the remote control 24 and, in response, provides corresponding electrical signals to the ASIC 42. In this illustrated embodiment, a standard telephone modem 50 and an ISDN modem 52 are coupled to ASIC 42 to provide Internet connections 32 and 34, respectively.

A TV interface 54 is coupled to the ASIC 42 to receive broadcast signals, such as an NTSC signal, and provide corresponding electrical signals to the ASIC 42, thereby allowing video and audio data carried on the broadcast signal 28 to be presented to the viewer on the television set 22. More specifically, a TV interface 54 may digitize the incoming video signal, stored in RAM 58, so that the ASIC 42 and the CPU 40 can process the video signal before displaying it on the television set 22. The configuration enables the set-top box 20, for instance, to generate shared screen viewing where the broadcast video signal only occupies a portion of the screen. The remaining screen area thus can be used to display various user interface controls or data, such as video programming information.

Also coupled to the ASIC 42 is a read-only memory (ROM) 56, which stores program code for implementing operating system and application software to be executed by the set-top box 20. Note that the ROM 56 maybe a programmable ROM (PROM), or any form of erasable PROM (EPROM), or flash memory. An optional mass storage device 60 may be provided and coupled to the ASIC 42. The mass storage device 60 may be used to store software or data. The Mass storage device 60 can be any suitable medium for storing machine-executable instructions, such as magnetic disks, optical disks, or the like.

Figure 3:
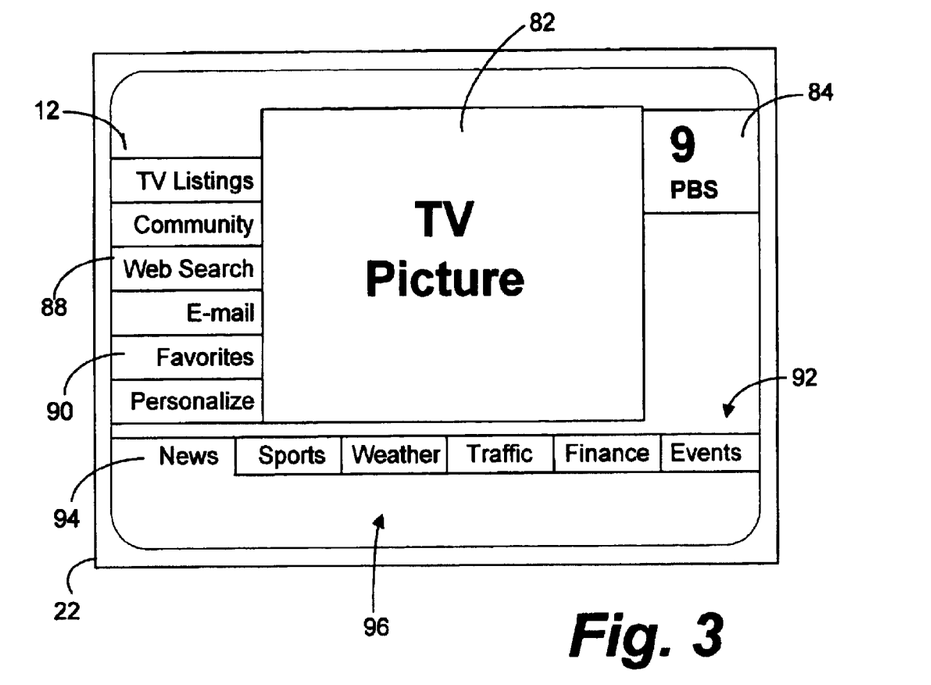
FIG. 3 is an illustrative screen display of the terminal in a windowed, television mode.

FIG. 3 is a sample screen display of user interface 12 as displayed on television set 22. The terminal 10 may operate in either a full-screen configuration or a windowed configuration. FIG. 3 illustrates the user interface 12 in the windowed configuration. Illustrated is a main window 82 for displaying information associated with the current mode of operation of the terminal 10. In this example, the terminal 10 is operating in the television mode, wherein a main window 82 displays a television picture. A channel indicator 84 may be visible for indicating which television channel is currently being displayed in the main window 82.

A button bar 92 at the bottom of the user interface 12 provides the user with easy access to items of interest associated with the current operating mode of the terminal 10. For example, by triggering the News button 94 the user is presented with news-related information in the display area 96. Other elements of the user interface 12 may include option buttons, such as a Web Search option button 88 and a Favorites option button 90, for accessing various functionality provided by the terminal 10. As will be appreciated by those skilled in the art, the use of the option buttons may take the user to several different pages or screens with which the user can interact. Often a user may become lost after switching through several different screens during a session. The present invention provides a mechanism which may be selectively invoked at any screen or at any time to provide the user with a familiar set of options.

Figure 4:
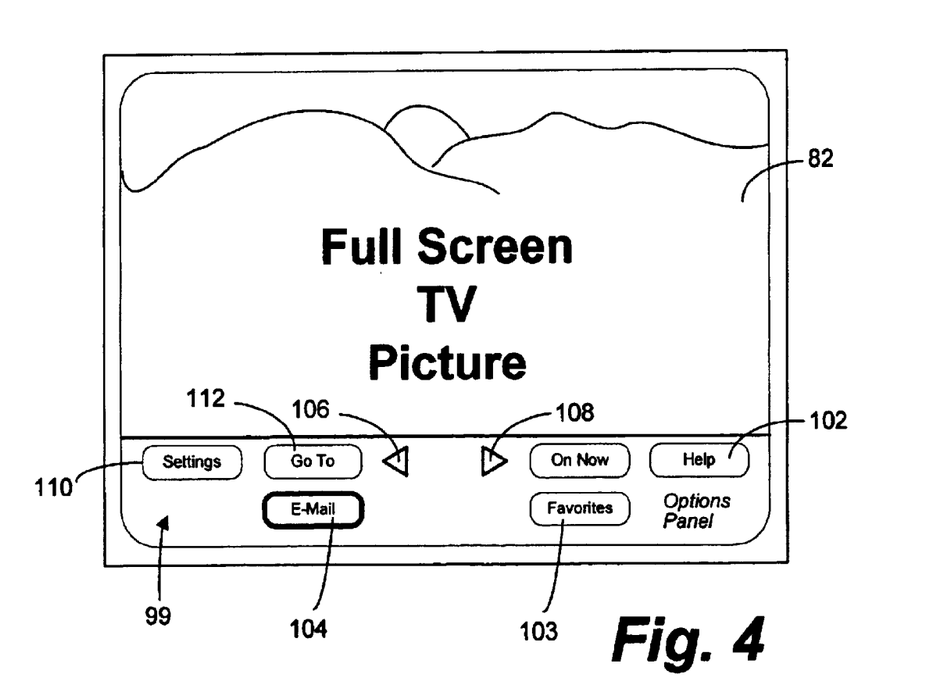
FIG. 4 is an illustrative screen display of the terminal in a full-screen configuration having an options panel displayed thereon.

As mentioned above, the terminal 10 may operate in either a full-screen configuration or a windowed configuration FIG. 4 is a simple screen display of the user interface 12 in the full-screen configuration. In the full-screen configuration, the main window 82 occupies the entire display of the television set 22. However, an option panel 99 is illustrated at the bottom of the screen display.

In accordance with the present invention, the options panel 99 may be invoked by a user command, such as by pressing a button on the remote control 24. Preferably, the options panel 99 is hidden from view until selectively invoked by the user. The options panel 99 may be selectively invoked by the user at any time and regardless of the content of the main window 82. For example, if the user has browsed the Internet to a point where the user is lost or unfamiliar with the page being displayed, or if the user is viewing television programming (such as the example illustrated in FIG. 4), the user may invoke the options panel 99.

The options panel 99 includes several options, accessible via displayed buttons, that provide the user with access to the features of the terminal in a familiar manner. The options panel 99 includes persistent buttons and context buttons. The persistent buttons respond to being triggered in a similar manner regardless of the content of the main window 82. For example, the help button 102, when triggered, provides the user with an informative help screen to assist with the current task. Although the help screen launched may vary in content, the help button 102 is persistent. In contrast, context buttons respond when triggered in a manner that may be dependent upon the content of the main window 82. For example, triggering the Favorites button 103 while viewing television programming may result in a list of favorite television programs being displayed. However, triggering the Favorites button 103 while browsing the Internet may result in a list of favorites Internet sites being displayed.

The options panel 99 also includes a Back button 106 and a Forward button 108, which will be familiar to those skilled with Internet browsing software. In the television mode, the Back button 106 and Forward button 108 may be alternatively and optionally used to change channel selection. A Settings button 110 gives the user access to configuration settings related to be current mode of operation. A Go to button 112 allows the user to input a location identifier or address, such as a URL, and jump directly to a page or location of interest.

When invoked, the options panel 99 may query the system to identify the current operating mode of the terminal 10, i.e., either television mode or Internet mode, full-screen configuration or windowed, and so forth. Based on that determination, the options panel 99 may populate itself with a pre-defined set of persistent buttons, and with any context-sensitive buttons as defined in a setup configuration. The setup configuration may additionally identify the alternative action or features to be provided when triggered. When a button on the options panel 99 is triggered, the system may update the current operating mode of the terminal 10 and cause the options panel 99 to refresh its data. Alternatively, the options panel 99 may identify when a button is triggered and query the system for the current operating mode.

The options panel 99 may also provide access to one or more software objects that contain properties and methods to allow a page to change, query, or invoke elements of the options panel 99. For example, web developers may incorporate codes into a web page to allow the page, when visited, to invoke a method in an object to set the current context of the options panel 99. For instance, a Web-based Internet mail page may invoke an method in a software object representing a particular context button to alter a property of the context button to reflect the fact that the user is currently interacting with an e-mail service. Other examples will become apparent to those skilled in the art.

Figure 5:
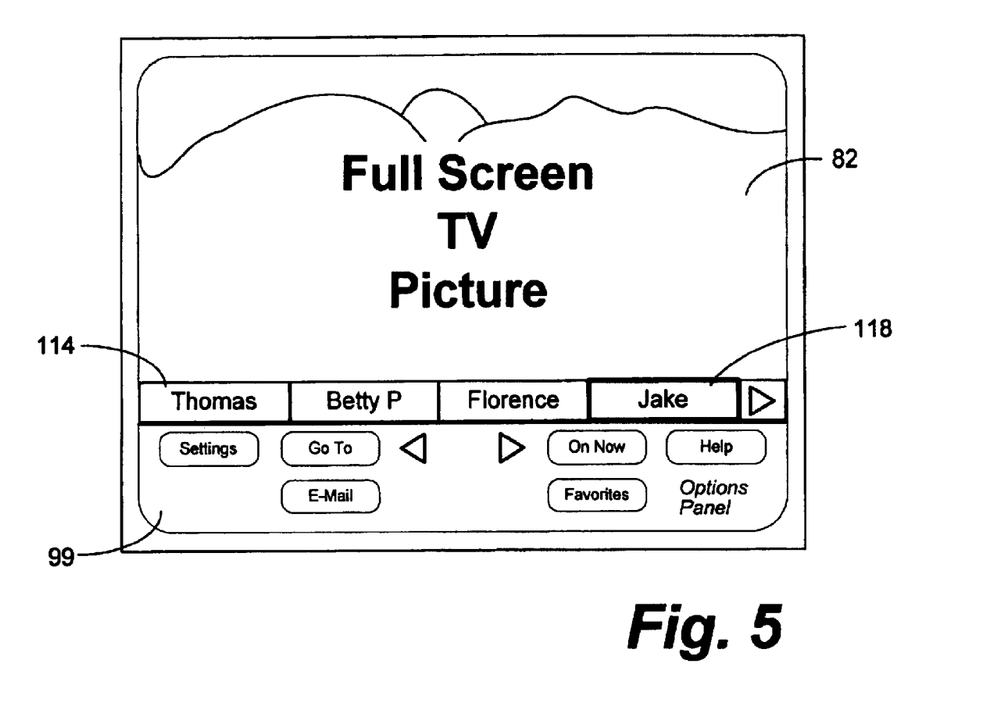
FIG. 5 is an illustrative screen display of the terminal having a second level options panel displayed thereon.
Figure 6:
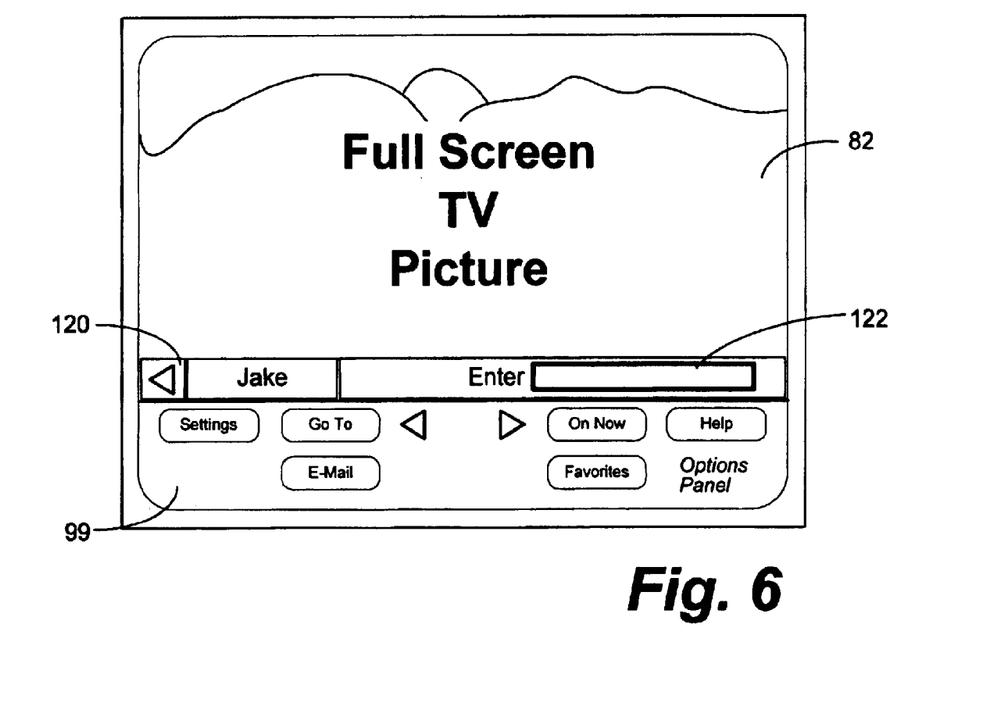
FIG. 6 is an illustrative screen display of the terminal having another second level options panel displayed thereon.
Figure 7:
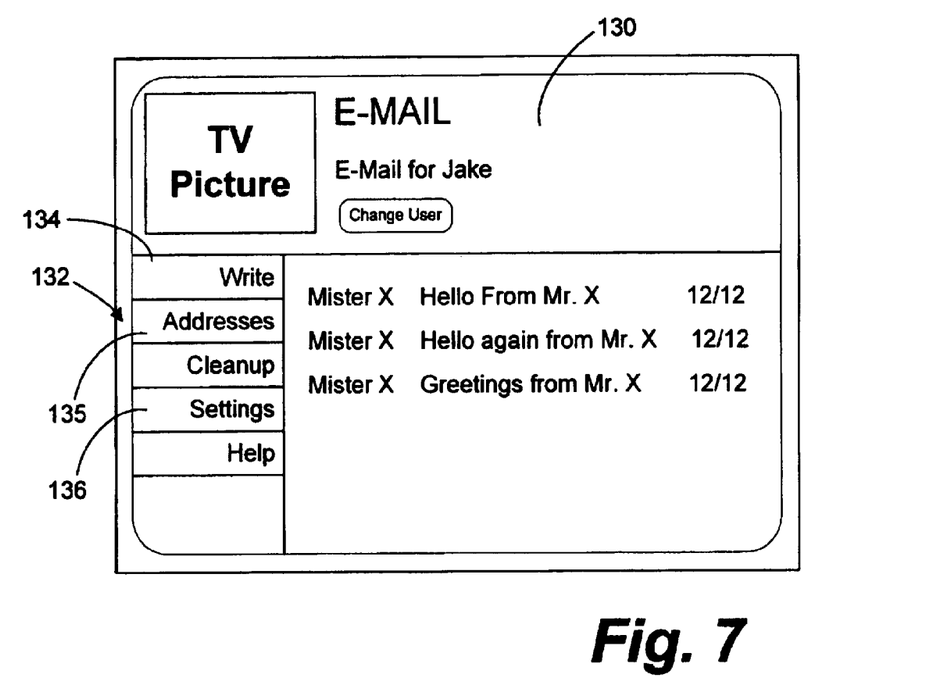
FIG. 7 is an illustrative screen display of the terminal having an e-mail application page displayed thereon.

FIGS. 5, 6, and 7 are illustrative screen displays illustrating a series of events that occur in response to triggering E-mail button 104 while the main window 82 is in television mode. Turning first to FIG. 5, in response to triggering an E-mail button 104, a second level panel 114 appears just above the options panel 99. In this embodiment, the second level panel is a supplemental options panel that may be invoked by the options panel 99 in response to triggering a button on the options panel 99. The supplemental options panel may include a second set of context buttons that allow the user to provide additional input or commands. In this example, the second level panel 114 includes context buttons that allow the user to identify himself to the terminal 10, "Jake" in this example, so that the user receives the correct set of e-mail. Although this example illustrates the use of context buttons to identify individual users, the present invention has application in systems that do not require uniquely identifying the user.

Triggering the "Jake" context button 118 on the second level panel 114 may, optionally, call another second level panel 120 (FIG. 6) that allows the user to enter a password or personal identification number 22. Upon entering the password 22, the user is presented with an E-mail page 130 (FIG. 7) that shows the e-mail activity for the identified user (Jake). From the E-mail page 130, the user may perform typical e-mail functions from a button bar 132, such as write new e-mail 134, administer e-mail addresses 135, or modify e-mail settings 136. It should be appreciated that the user interface elements illustrated in FIGS. 4–7 allow the user to jump to Internet functionality, i.e. e-mail, directly from the full-screen configuration of television mode without having to return to a home page or other starting location.

Figure 8:
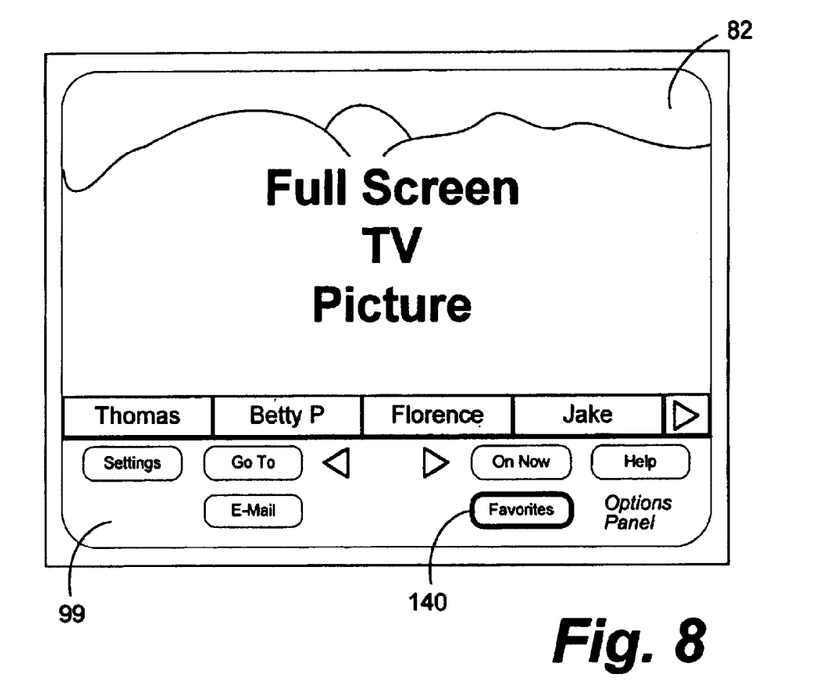
FIG. 8 is an illustrative screen display of the terminal having the options panel and yet another second level options panel displayed thereon.
Figure 9:
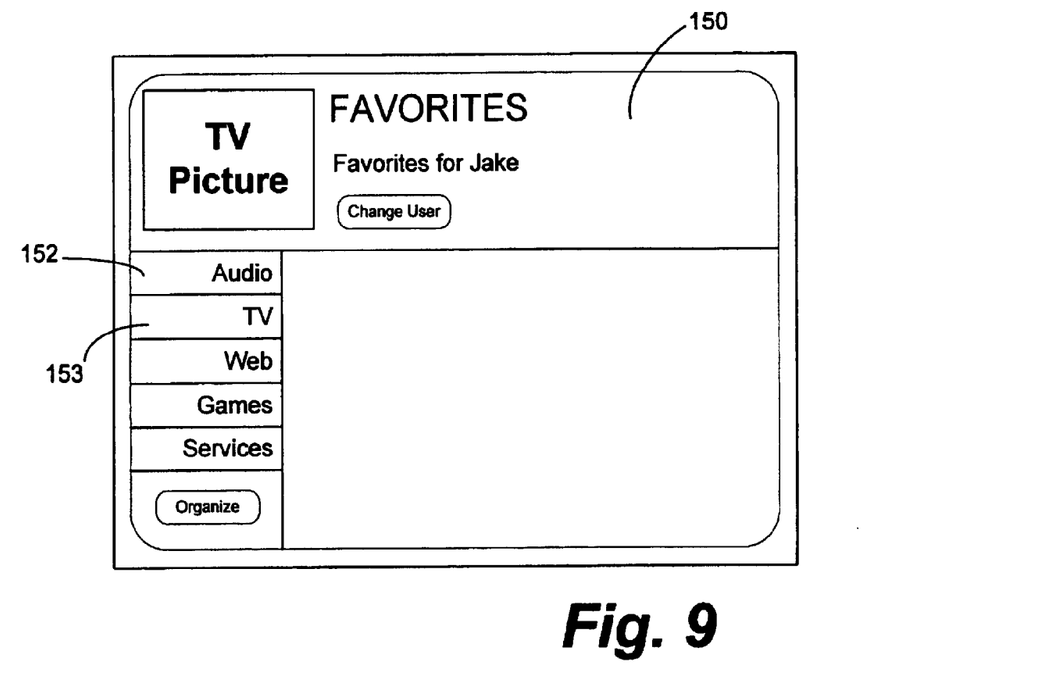
FIG. 9 is an illustrative screen display of the terminal having a Favorites page displayed thereon.

FIGS. 8 and 9 illustrate the user interface elements when a Favorite context button 140 is triggered. In this embodiment, the functionality invoked when the Favorites button 140 is triggered is based on a determination that the main window 82 is in the television mode. Accordingly, triggering the Favorites button 140 invokes a Favorites page 150 (FIG. 9) associated with the current user (Jake). The Favorites page 150 may contain content specifically tailored for the television mode if the main window 82 was in the television mode. For example, a button panel 152 may include buttons, such as TV button 153, that activate features specific to the operating mode of the main window 82 when the Favorites button 140 was triggered.

FIG. 10 illustrates, again, the use of contextual buttons to provide the user with features dependent on the current operating mode of the terminal 10. In this example, the On Now button 160 reacts to trigger by displaying a second level panel 162 dependent on the content of the main window 82. In this embodiment, the On Now button 160 causes a listing to be displayed of the title of the current television program 163 as well as the title of the next television program 164 to be shown on the current channel.

Figure 10:
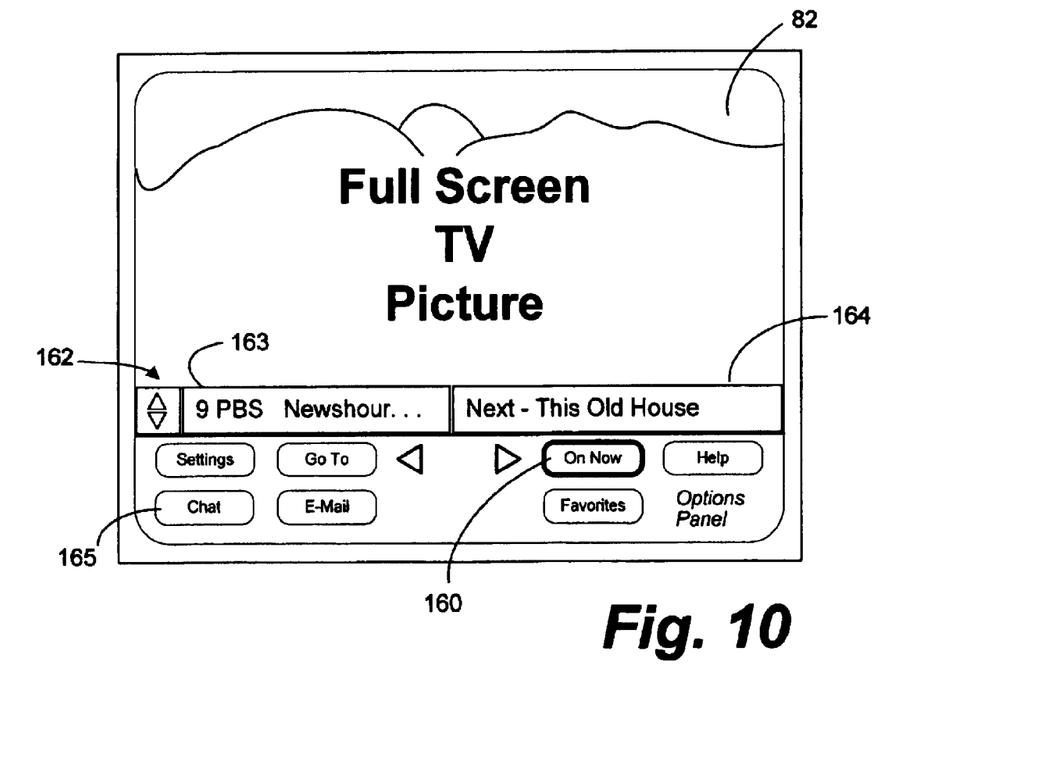
FIG. 10 is an illustrative screen display of the terminal having the options panel with a registered context button displayed thereon.

Also illustrated in FIG. 10 is a Chat context button 165. In addition to its basic features and functionality, additional features or functionality may be provided to the set-top box 20 after installation by adding supplemental applications. For example, a chat program (not shown) may be incorporated into the set-top box 20 to allow users to electronically "chat" with other users via the Internet. The supplement applications may be stored locally, such as in ROM 56 or on mass storage 60. Alternatively, the applications may be run remotely, such as via a remote network connection over the phone line 32, the ISDN line 34, or the broadcast signal medium 28.

In accordance with another aspect of the invention, the options panel 99 provides the ability for supplemental applications to register with the system and provide an additional button, such as Chat button 165, on the options panel 99. During an initialization sequence, an API provided by the options panel 99 may be called to register the supplemental application. Registering the application may include identifying to the system what actions to take in response to identified modes of operation of the terminal 10. As discussed above, the options panel 99 may, in one embodiment, provide software objects that contain properties and methods for allowing an application to change, query, or invoke elements of the options panel 99. The supplemental application may call a method in a software object representing aspects of the options panel 99 to create a new button, such as the Chat button 165. The application may, in addition, register with the options panel 99 information defining what actions to take in response to triggering the new button. That information may associate particular actions, such as launching a chat program, with types or classes of content that may be presented in the main window 82 or with the current operating mode of the terminal 10. The information defining the actions to take may be contained within one or more files stored in association with the terminal 10. Thus, the options panel 99 may be dynamically modified to reflect supplemental applications, such as applications of interest to the user, or applications supplied by a service provider.

Figure 11:
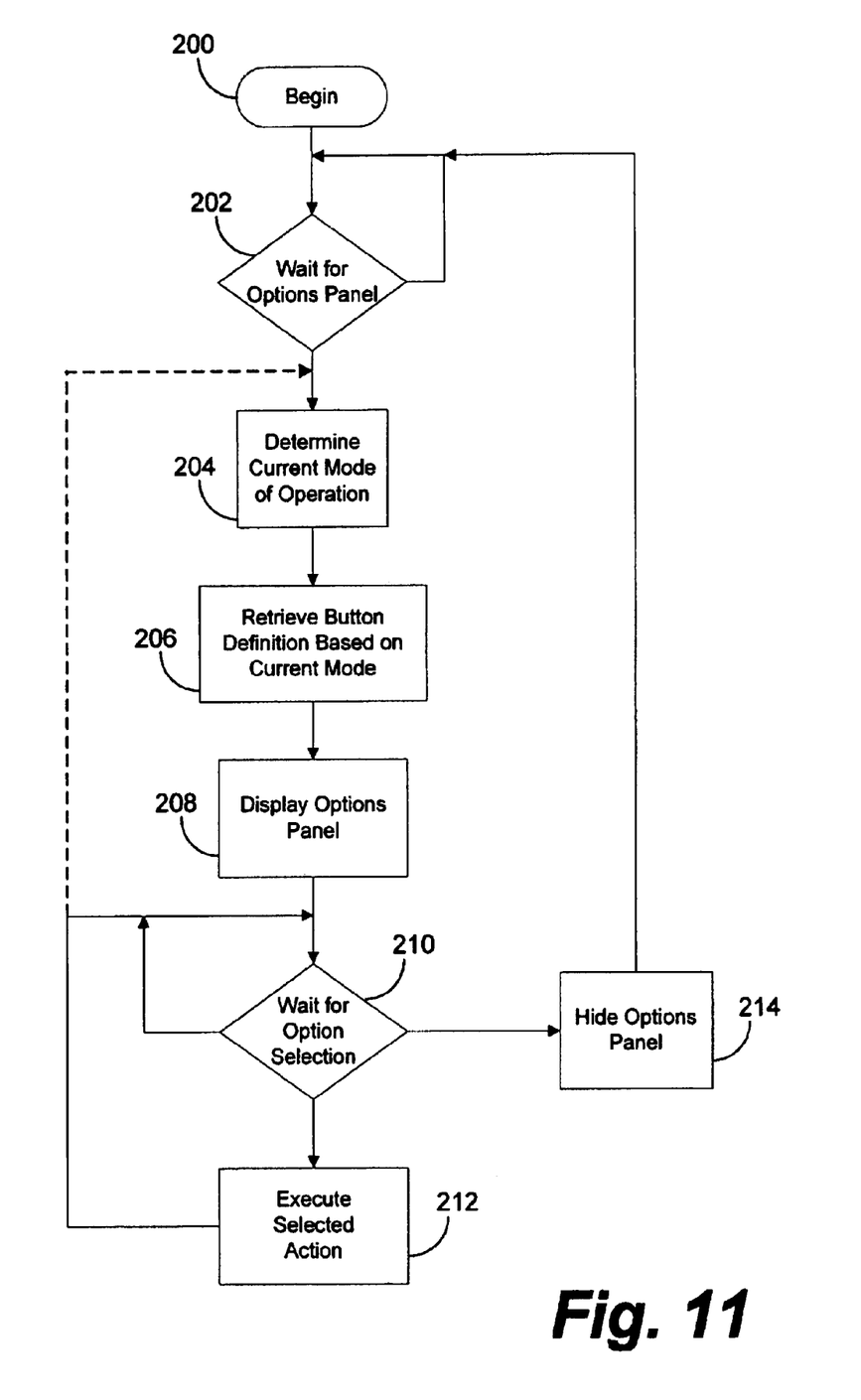
FIG. 11 is a logical flow diagram illustrating a series of steps performed by one embodiment of the invention.

FIG. 11 is a logical flow diagram generally illustrating a process performed by one embodiment of the invention. As represented in FIG. 11, the process begins at step 200, where the terminal 10 awaits user interaction. At decision block 202, the terminal 10 is essentially awaiting an indication that the options panel 99 has been invoked. As mentioned above, the options panel 99 may be invoked when the user presses a button on the remote control 24, or otherwise causes the options panel to be invoked. Also, the options panel 99 may be initially invoked by default, e.g., when the set-top box 20 is powered up. When the options panel is invoked, the process proceeds to block 204.

At block 204, the current mode of operation of the system is determined. As mentioned above, the terminal 10 may be operating in either a television mode or in an Internet-related mode. At block 206, information is retrieved that defines the actions to be taken by the buttons to be displayed, and/or their appearance/position on the options panel 99. As mentioned above, the options panel 99 may include context buttons that react in a different manner depending upon the current mode of operation. After the relevant information for each button has been retrieved, the options panel 99 is displayed at block 208.

At decision block 210, the process awaits the selection of an option on the options panel 99. When a button is selected on the options panel, the action associated with the selected button is executed at block 212. When the action associated with the selected button is complete, the process returns to decision block 210 and awaits further user interaction. Alternatively, the process may return to block 204 if the action affects the current mode of operation.

If at decision block 210, an option has not been selected within a predetermined amount of time, or if the user has elected to hide the options panel 99, the process proceeds to block 214, where the options panel 99 is hidden. Processing returns from block 214 to decision block 202 which, again, awaits user interaction.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a system operating in a mode and having a graphical user interface including a display and a selection device, a method of providing user interaction with the display, comprising:

displaying an options panel having at least one context option, the context option having a first action associated with a first mode of operation of the system and a second action associated with a second mode of operation of the system;

in response to the context option being triggered when the system is in the first mode of operation, executing the first associated action;

in response to the context option being triggered when the system is in the second mode of operation, executing the second associated action, wherein the first action includes displaying another set of options while the options panel is displayed, such that the options panel and the other set of options are displayed concurrently; and wherein the appearance and contents of the context option remains unchanged throughout the first and second modes of operation, and wherein the context option causes actions similar to a back or forward button of an Internet browser when selected while in the first mode and causes television channel selection when selected while in the second mode.

2. The method of claim 1, wherein the context option includes visiable content that remains the same throughout the first and second modes of operation.

3. The method of claim 2, wherein the context option causes a set of favorite Internet links to be displayed when selected while in the first mode and causes a set of favorite television channels to be displayed when selected while in the second mode.

4. The method of claim 1, wherein the first mode is a television mode having a plurality of channels associated therewith and a further comprising displaying a button bar that includes a plurality of buttons that allow selection of the channels by subject matter.

5. The method of claim 4, wherein the options panel further includes a persistent button that causes an action to occur regardless of the mode in which the system is operating.

6. The method of claim 5, wherein the persistant button provides a prompt for entering a uniform resource locator (URL) while the system is operating in the television mode.

7. A computer-readable medium having computer-executable instructions for performing the method of claim 1.

8. In a system operating in a mode and having a graphical user interface including a display and a selection device, a method of providing user interaction with the display, comprising:
  displaying an options panel having at least one context option, the context option having a first action associated with a first mode of operation of the system and a second action associated with a second mode of operation of the system;
  in response to the context option being triggered when the system is in the first mode of operation, executing the first associated action;
  in response to the context option being triggered when the system is in the second mode of operation, executing the second associated action, wherein the first action includes displaying another set of options while the options panel is displayed, such that the options panel and the other set of options are displayed concurrently; and
  wherein the first mode is a television mode having a plurality of channels associated therewith and a further comprising displaying a button bar that includes a plurality of buttons that allow selection of the channels by subject matter, wherein the options panel further includes a persistent button that causes an action to occur regardless of the mode in which the system is operating, and wherein the persistent button provides a prompt for entering a uniform resource location (URL) while the system is operating in the television mode.

9. The method of claim 8, wherein the context option includes visible content that remains the same throughout the first and second modes of operation.

10. The method of claim 9, wherein the context option causes a set of favorite Internet links to be displayed when selected while in the first mode and causes a set of favorite television channels to be displayed when selected while in the second mode.

11. The method of claim 8, wherein the appearance and contents of the context option remains unchanged throughout the first and second modes of operation.

12. The method of claim 11, wherein the context option causes actions similar to a back or forward button of an Internet browser when selected while in the first mode and causes television channel selection when selected while in the second mode.

13. A computer-readable medium having computer-executable instructions for performing the method of claim 8.

* * * * *